Patented Jan. 8, 1924.

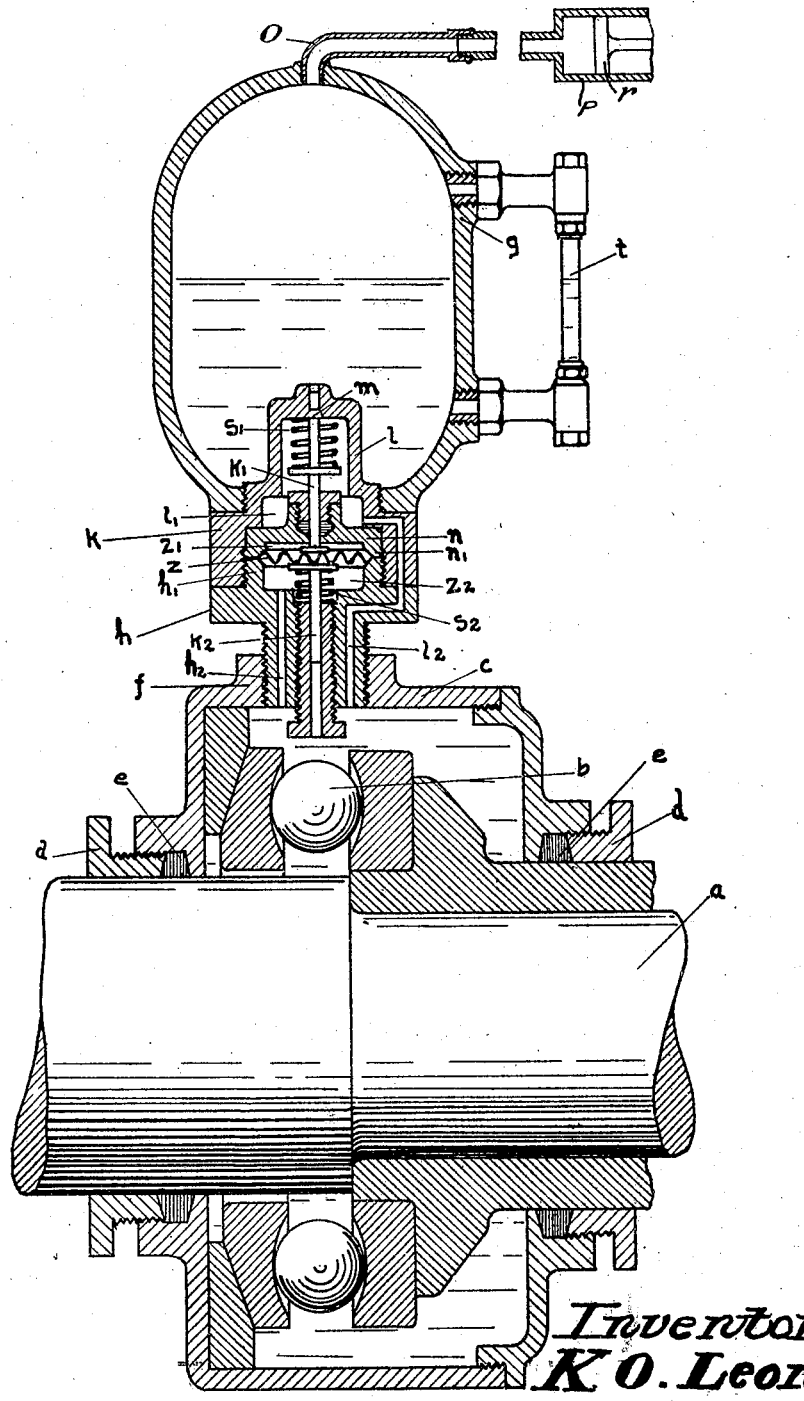

1,479,969

UNITED STATES PATENT OFFICE.

KARL OSKAR LEON, OF STOCKHOLM, SWEDEN, ASSIGNOR, BY MESNE ASSIGNMENTS, TO NYA NORDISKA KULLAGER AKTIEBOLAGET, OF GOTTENBORG, SWEDEN.

LUBRICATING.

Application filed March 2, 1920. Serial No. 362,861.

*To all whom it may concern:*

Be it known that I, KARL OSKAR LEON, citizen of Sweden, residing at Stockholm, in Sweden, have invented certain new and useful Improvements in Lubricating, of which the following is a specification.

This invention refers to means for lubricating shaft bearings and has for its object to provide means for a reliable and safeworking supply of lubricant to a bearing and is especially intended for bearings operating submerged in water or surrounded of humid air where the pressure of the water or humidity surrounding makes the supply of lubricants to the bearing difficult as for instance is the case with water turbines, machines in the paper pulp industry and the like.

The invention consists therein, that a certain pressure is effected to the lubricant in the bearing in order to overcome the resistance set forth by the water or humidity which surrounds the shaft in the bearing so that the lubricant will not be displaced by the counterpressure of the water.

The invention further consists therein that the pressure wanted is obtained by means of a container for a pressure fluid which is inserted into the conductor supplying the lubricant to the bearing which container co-operates with the admission valve for the lubricant, the pressure of which corresponds to the certain pressure wanted on the lubricant in the bearing.

The pressure fluid can be of any arbitrary kind and may consist in a liquid or in compressed air or in any other suitable compressed gas.

The vessel for the lubricant may be provided to work under pressure, so that lubricant will be forced into the bearing through the admission valve when opened by the action of the pressure container.

In the accompanying drawing there is illustrated an embodiment of the invention to exemplify a mode of employment.

Referring to the figure a shaft $a$ is mounted in an antifriction thrust bearing comprising two thrust collars with balls $b$ operating therebetween. The bearing is encircled by a casing $c$, which must be closed all around. Around the shaft ends, as illustrated, a stuffing gland $d$ and packing $e$ secure the tightness of the casing $c$ against the water or humidity surrounding, and at the upper side of the casing $c$ is provided a collar $f$ into which the neck of an intermediate member $h$ is screwed. On the member $h$ there is screwed a vessel $g$ for the lubricant either directly or, as exemplified in the drawing, by means of a further intermediate member $k$. The upper part of this member $k$, or, if the intermediate member $k$ is dispensed with the bottom of the vessel $g$ the member $h$ is formed as a casing $l$ projecting into the vessel $g$ and covering a cavity $l_1$ the bottom of which is closed by a disc $n$ passed into a corresponding recess in the walls of the member $k$ or the corresponding portion of the vessel $g$, if member $k$ fails, the upper side of the member $h$ is provided with an annular edge $h_1$ which supports a corrugated plate $z$ upon which a downward directed annular shaped edge $n_1$ of the disc $n$ rests. The corrugated plate $z$ screws as a portion wall between a cavity $z_1$ above the plate $z$ and a cavity $z_2$ below said plate, and the last mentioned cavity is in communication with the interior of the bearing casing $c$ by means of a passage $h_2$ through the neck of the member $h$. The cavity $z_1$ is completely closed and contains a quantity of a liquid or a gas under pressure. Upon the upper side of the corrugated plate $z$ rests the disc shaped end of a piston $k_1$ the upper end of which supports a valve $m$ arranged so as to close against the fluid-pressure in the vessel $g$. A spiral spring $s_1$ keeps the piston $k_1$ pressed downwards towards the corrugated plate $z$. In a similar way a spring $s_2$ forces a piston $k_2$ with its disc shaped upper end upwards towards the lower side of the plate $z$. The cavity $l_1$ in the casing $l$ above the disc $n$ is in communication with the interior of the casing $c$ by means of a passage $l_2$ through the neck of the member $h$.

This embodiment of my improved lubricating device operates as follows:

The vessel $g$ is supplied with a lubricant to a suitable extent and attached to the casing $c$. The two threaded holes on the right hand side of the vessel $g$ may be utilized as joints for an oil gauge $t$ and the lubricant can be poured in through a hole at the top of the gauge $t$ which hole is closed by a screw cap. The springs $s_1$ and $s_2$ as well as the pressure of the fluid in the closed cavity $z_1$ are adjusted to correspond to the counterpressure of the water or humidity surrounding which normally will occur in the bearing casing $c$. If this pressure would happen to fall below its normal value, the same decrease of the pressure takes place in the cavity $z_2$ by means of the communication $h_2$, and as a consequence the excessive pressure in the closed cavity $z_1$ forces down the middle portion of the corrugated plate $z$ whereby the piston $k_1$ under the action of the spring $s_1$ descends in the same degree as the plate $z$ becomes deflected downwards. The valve $m$ now is caused to open inwards the cavity $l_1$ and the lubricant forced down into the bearing $c$ through the cavity $l_1$ and the passage $l_2$ by the weight of the lubricant in the vessel $g$. As soon as the pressure in the bearing casing $c$ has attained its normal value, the corrugated plate $z$ is forced backwards and the piston $k_1$ raised closing the valve $m$ and interrupting further supply of lubricant into the bearing casing $c$.

The object of the improved lubricating device is to maintain a certain pressure in the casing $c$, and this pressure must exceed the pressure of the fluid surrounding said casing. Of course from a theoretical point of view, it is possible to bring the lubricant in the casing under a certain pressure from the beginning, which pressure, if the tightening means (such as the packing $e$) should be completely effective in all directions, could be maintained. Since, however, such tightening means, which are used in practice, never operate entirely satisfactorily, the provision of a device is necessary which functions to maintain the pressure in the casing $c$ at a predetermined height, or in other words at a height in excess of the pressure outside the casing $c$, so that the surrounding fluid is unable to enter the casing of the bearing $b$. The interior of the casing $c$ according to this invention is by means of the passages $l_2$ in communication with the vessel $g$, which contains a lubricant, subjected to a certain pressure. The proper height of this pressure however, is of but little importance. The passages between the vessel $g$ and the casing $c$ is controlled by the automatically operating valve $m$, which is actuated in one direction by the diaphragm $z$ and this member is actuated by the pressure in the hermetically sealed cavity $z'$, which cavity from the beginning is filled with some fluid under a certain pressure.

As soon as the pressure on the underside of the diaphragm $z$, that is, the pressure within the casing $c$, remains constant, the valve $m$ is in a definite position, which in this instance means that the passage from the vessel $g$ is closed. If, on the contrary, the pressure in $c$ falls below its normal value, the valve $m$ is forced downwardly by the greater presure in the vessel $g$ and when the valve $m$ is opened lubricant flows through the passage $l_2$ until the pressure within the casing $c$ again attains its normal value. The pressure in the vessel $g$ may be of any arbitrary height, without having any influence upon the pressure in the casing $c$. For instance an air pump may be provided by means of which the pressure required in the vessel $g$ may be maintained, it only being necessary that the pressure in the vessel $g$ does not fall below the pressure required to open the valve $m$ when the pressure in the casing $c$ falls below normal. The air pump can be applied by means of the threaded hole shown in the top of the vessel $g$. To this hole in the upper part of the vessel $g$ there is joined a pipe $o$ which is connected with a pump cylinder $p$ having a plunger $r$. Through this arrangement it is possible to procure a pressure in the vessel $g$. It is to be observed, that it is unimporant what pressure there will be in the vessel $g$ as the supply of the bearing is independent of how the valve $m$ is working. This valve is in its turn influenced by the membrane $z$ and the operation of the membrane $z$ is regulated by the pressure in the hermetically sealed cavity $z'$. It is to be borne in mind that the casing $c$ encloses entirely the bearing $b$.

From the description given it is evident, that the lubricating pressure in the bearing casing $c$, will be kept constant or practically constant at a value corresponding to the normal counter-pressure of the water surrounding on account of the fluid pressure in the closed cavity $z_1$ provided that the weight of the lubricant quantity in the vessel $g$ is sufficient to counteract the pressure in the bearing $c$, that will say the weight of the lubricant quantity in the vessel $g$ is to be greater than or equal to the fluid pressure in the closed cavity $z_1$. If not an additional pressure will be necessary in the vessel $g$ to force the lubricant into the bearing case $c$.

Having thus clearly described my invention and how it is to be performed what I claim as new and want to protect by Letters Patent is:

1. An improved device for feeding lubricant into a shaft bearing comprising a vessel for the lubricant, a passageway from said vessel into the bearing, a check valve to automatically shut off said passageway, a closed pressure fluid container with a flexible bottom, a piston resting upon said flexible bottom and supporting said check valve, a spring for forcing said piston toward said flexible bottom, a passageway from the bearing to the rear side of the said flexible bottom, a spring actuating said flexible bottom on the said rear side to counterbalance the fluid pressure in the container, and means to control the spring action upon the said flexible bottom.

2. In combination, a shaft, a bearing for said shaft, a casing enclosing said bearing, a lubricant supply vessel, means for creating a pressure within said vessel sufficient to prevent moisture from entering the casing, a passageway for feeding lubricant from the vessel to the casing, a valve for controlling the flow of lubricant through said passageway, and pressure responsive means responding to pressure variations in the vessel and casing for opening said valve when the pressure in the casing falls below the pressure in the vessel.

3. A combination as claimed in claim 2 in which the pressure responsive means includes a chamber containing fluid under pressure, and a diaphragm forming one wall of said chamber.

4. A combination as claimed in claim 2 in which the pressure responsive means includes a hermetically sealed chamber containing a fluid under pressure, a diaphragm forming one wall of said chamber, a stem having one of its ends operatively connected to said valve and its other end engaging said diaphragm, a spring for urging said stem towards said diaphragm, a second stem engaging the opposite side of said diaphragm, and a spring for urging the second stem towards said diaphragm.

In testimony whereof I have affixed my signaure.

KARL OSKAR LEON.